United States Patent
Xu et al.

(10) Patent No.: US 8,671,715 B2
(45) Date of Patent: Mar. 18, 2014

(54) HE-3 RECOVERY FROM NATURAL HELIUM BY DISTILLATION

(75) Inventors: Jianguo Xu, Wrightstown, PA (US); David Ross Graham, Harleysville, PA (US); Vipul S. Parekh, Allentown, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 197 days.

(21) Appl. No.: 13/403,409

(22) Filed: Feb. 23, 2012

(65) Prior Publication Data

US 2013/0219956 A1 Aug. 29, 2013

(51) Int. Cl.
*F25J 3/00* (2006.01)
*F25J 1/00* (2006.01)

(52) U.S. Cl.
USPC .................. 62/639; 62/608; 62/610

(58) Field of Classification Search
USPC ........................... 62/608, 610, 639
See application file for complete search history.

(56) References Cited

U.S. PATENT DOCUMENTS

| 4,525,186 A | 6/1985 | Garwin |
| 2011/0174017 A1* | 7/2011 | Victory et al. .................. 62/620 |

OTHER PUBLICATIONS

I. F. Kuz'menko, et al., "Separation of a He3-He4 Mixture by Low-Temperature Rectification", Chemical and Petroleum Engineering, 1995, pp. 119-122, vol. 31, Nos. 1-2.

* cited by examiner

*Primary Examiner* — Frantz Jules
*Assistant Examiner* — Webeshet Mengesha
(74) *Attorney, Agent, or Firm* — Eric J. Schaal

(57) ABSTRACT

A system and method for recovering helium-3 from helium. A distillation column having a top section that is smaller in diameter than a main section is provided. The column also includes an intermediate condenser located in the main section and above a helium feed stream. Reflux to the column can be provided by liquid helium-3 from a conduit or from an overhead condenser. In a preferred cycle, the distillation column is operated at a subatmospheric pressure, and in a temperature range between 2.3 K and 4.3 K.

20 Claims, 3 Drawing Sheets

HE-3 RECOVERY FROM NATURAL HELIUM BY DISTILLATION

BACKGROUND OF THE INVENTION

This application relates to the separation of helium-3 (hereinafter, "He-3") from helium.

He-3 and helium-4 (hereinafter "He-4") are naturally-occurring isotopes of helium. He-3 is currently used in a variety of applications, including neutron detection instruments, cryogenics, medical imaging, and nuclear fusion research. The He-3 concentration in naturally-occurring helium (hereinafter, "helium") is very small—typically on the order of 0.1-1.0 ppm by volume, with the remainder comprising He-4.

In 1995, Kuz'menko and Lebedev (1995, Kuz'menko and Lebedev, Chemical and Petroleum Engineering, Vol. 31, Nos. 1-2, 1995, translated from Khimischeskoe I Neftyanoe Machinostroenie, No. 2, pp. 38-39, Feb. 1995) demonstrated that it is possible to separate He-3 from helium under laboratory conditions, using a conventional distillation process in a laboratory-sized packed column. The column used in this study was very small, having a column diameter of 20 mm and height of 200 mm.

Commercial-scale production of He-3 is impractical, however, using distillation processes of the prior art. Typical purity requirements for He-3 are in the range of 99.9% to 99.9999%. Due to the very low concentration of He-3 in naturally-occurring helium, it could take several months, or even years, for the He-3 concentration in the top of a conventional distillation column to reach an acceptable level, particularly if the desired He-3 purity is high, such as 99.9% or higher.

Therefore, there is a need for an improved distillation process that is suitable for commercial-scale recovery of He-3.

BRIEF SUMMARY OF THE INVENTION

The disclosed embodiments satisfy the need in the art by providing a distillation process that enables the more efficient recovery of He-3 from helium, and enables the withdrawal of a He-3-enriched overhead stream within a much shorter time than the systems of the prior art.

Aspect 1. A method for recovering He-3 from helium, the method comprising:

(a) introducing a feed stream comprising helium into a main section of a distillation column at a first location;

(b) withdrawing an overhead stream comprising He-3-enriched helium from a top section of the distillation column, the main section of the distillation column being located below the top section, the main section having a first diameter that is greater than a second diameter of the top section;

(c) withdrawing a bottom stream comprising He-3 depleted helium from a bottom portion of the main section of the column; and (d) condensing at least a first portion of a vapor stream in the distillation column by heat exchange with a first stream as the first stream passes through an intermediate condenser located at a third location within the main section of the distillation column, wherein the third location is above the first location.

Aspect 2. The method of any of Aspects 1 and 3 through 14, wherein step (b) comprises withdrawing and recovering an overhead stream comprising He-3-enriched helium from the top section, wherein the first diameter is at least four times larger than the second diameter.

Aspect 3. The method of any of Aspects 1, 2, and 4 through 14, wherein step (d) comprises condensing at least a first portion of a vapor stream in the distillation column by heat exchange with a first stream comprising helium or He-3 depleted helium as the first stream passes through an intermediate condenser located at a third location within the main section of the distillation column at which a concentration of He-3 within the distillation column is no more than 99.0%.

Aspect 4. The method of any of Aspects 1 through 3 and 5 through 14, further comprising the step of:

(e) maintaining an interior of the distillation column within a pressure range of 5-15 psia (35-103 kPa) while performing steps (a) through (d).

Aspect 5. The method of any of Aspects 1 through 4 and 6 through 14, further comprising the step of:

(f) maintaining an interior of the distillation column within a temperature range of 2.3K to 4.3K while performing steps (a) through (d).

Aspect 6. The method of any of Aspects 1 through 5 and 7 through 14, further comprising the steps of:

(g) dividing the overhead stream into a first portion of the overhead stream and a second portion of the overhead stream; and (h) reintroducing the first portion of the overhead stream into the top section of the distillation column as reflux.

Aspect 7. The method of any of Aspects 1 through 6 and 8 through 14, further comprising the step of:

(i) reboiling a portion of a liquid stream in the distillation column by heat exchange with a second helium stream.

Aspect 8. The method of any of Aspects 1 through 7 and 9 through 14, further comprising the steps of:

(j) condensing the overhead stream by heat exchange with an overhead vaporizing stream, wherein at least a portion of the overhead vaporizing stream is vaporized, forming an overhead vapor stream;

(k) returning a first portion of the overhead stream condensed in step (j) to the top section of the distillation column as reflux; and (l) storing a second portion of the overhead stream condensed in step (j) in a product storage vessel.

Aspect 9. The method of any of Aspects 8 and 10 through 14, further comprising the steps of:

(m) combining the overhead vapor stream with a third helium stream withdrawn from a downstream side of the intermediate condenser to form a first combined stream; and (n) reboiling a liquid stream in the distillation column by heat exchange with at least a first portion of the first combined stream.

Aspect 10. The method of any of Aspects 9 and 11 through 14, further comprising the step of:

(o) prior to performing step (m), increasing a pressure of the overhead vapor stream; and (p) increasing a second pressure of the first combined stream before performing step (n).

Aspect 11. The method of any of Aspects 9, 10, and 12 through 14, further comprising the step of:

(q) after performing step (n) on the at least a first portion of the combined stream, dividing the at least a first portion of the combined stream into the first stream and the overhead vaporizing stream, wherein the first stream comprises a major fraction of the first portion of the combined stream and the overhead vaporizing stream comprises a minor fraction of the first portion of the combined stream.

Aspect 12. The method of any of Aspects 11, 13, and 14, further comprising the steps of:

(r) diverting a bypass stream from the feed stream; and (s) combining the bypass stream with the at least a first portion of the combined stream before performing step (q).

Aspect 13. The method of any of Aspects 9 through 12 and 14, further comprising the step of:

(t) liquefying the second portion of the combined stream and introducing the liquefied second portion of the combined stream to a supply vessel that is in fluid flow communication with the feed stream.

Aspect 14. The method of any of Aspects 9 through 13, further comprising the step of:

(u) cooling the first portion of the combined stream by heat exchange with the overhead vapor stream and the third helium stream.

Aspect 15. A method for recovering He-3 from helium, the method comprising:

(a) introducing a feed stream comprising helium into a main section of a distillation column at a first location;

(b) withdrawing an overhead stream comprising He-3-enriched helium from a top section of the distillation column, the main section of the distillation column being located below the top section, the main section having a first diameter that is greater than a second diameter of the top section;

(c) dividing the overhead stream into a first portion of the overhead stream and a second portion of the overhead stream;

(d) reintroducing the first portion of the overhead stream into the top section of the distillation column as reflux and recovering the second portion of the overhead stream in a vessel;

(e) withdrawing a bottom stream comprising He-3 depleted helium from a bottom portion of the main section of the column;

(f) reboiling a liquid stream in the distillation column by heat exchange with a first helium stream;

(g) after performing step (f) on the first helium stream, condensing at least a first portion of a vapor stream in the distillation column by heat exchange with the first helium stream as the first helium stream passes through an intermediate condenser located at a third location that is above the first location and is within the main section of the distillation column; and (h) maintaining an interior of the distillation column within a pressure range of 5-15 psia (35-103 kPa) and within a temperature range of 2.3K to 4.3K while performing steps (a) through (g).

Aspect 16. An apparatus for recovering He-3 from helium, the apparatus comprising:

a distillation column having a main section and a top section, the main section being located below the top section and the main section having a first diameter that is greater than a second diameter of the top section;

a feed conduit for introducing a feed stream comprising helium into the distillation column at a first location, the feed conduit being in fluid flow communication with a supply of helium;

an overhead conduit for withdrawing a overhead stream comprising He-3-enriched helium from the top section of the distillation column;

a bottom conduit for withdrawing a bottom stream comprising He-3-depleted helium from a bottom of the main section of the distillation column; and an intermediate condenser located in the main section at a third location that is located above the first location and having an upstream side that is in fluid flow communication with an intermediate conduit that supplies a first stream to the upstream side of the intermediate condenser.

Aspect 17. The apparatus of any of Aspects 16 and 18 through 20, wherein the first diameter is at least four times larger than the second diameter.

Aspect 18. The apparatus of any of Aspects 16, 17, and 19, further comprising a first heat exchanger located in a bottom portion of the main section, wherein the intermediate conduit is in flow communication with a downstream side of the first heat exchanger.

Aspect 19. The apparatus of any of Aspects 16 through 18 and 20, further comprising a chamber conduit and a top condenser, the chamber conduit being in flow communication with the intermediate conduit and with a chamber located above the top section of the distillation column, the top condenser being located with the chamber, the overhead conduit being in fluid flow communication with an upstream side of the top condenser.

Aspect 20. The apparatus of any of Aspects 16 through 19, wherein the intermediate conduit is in fluid flow communication with the chamber and supplies a second stream to the chamber.

DETAILED DESCRIPTION OF THE INVENTION

Figure 1:
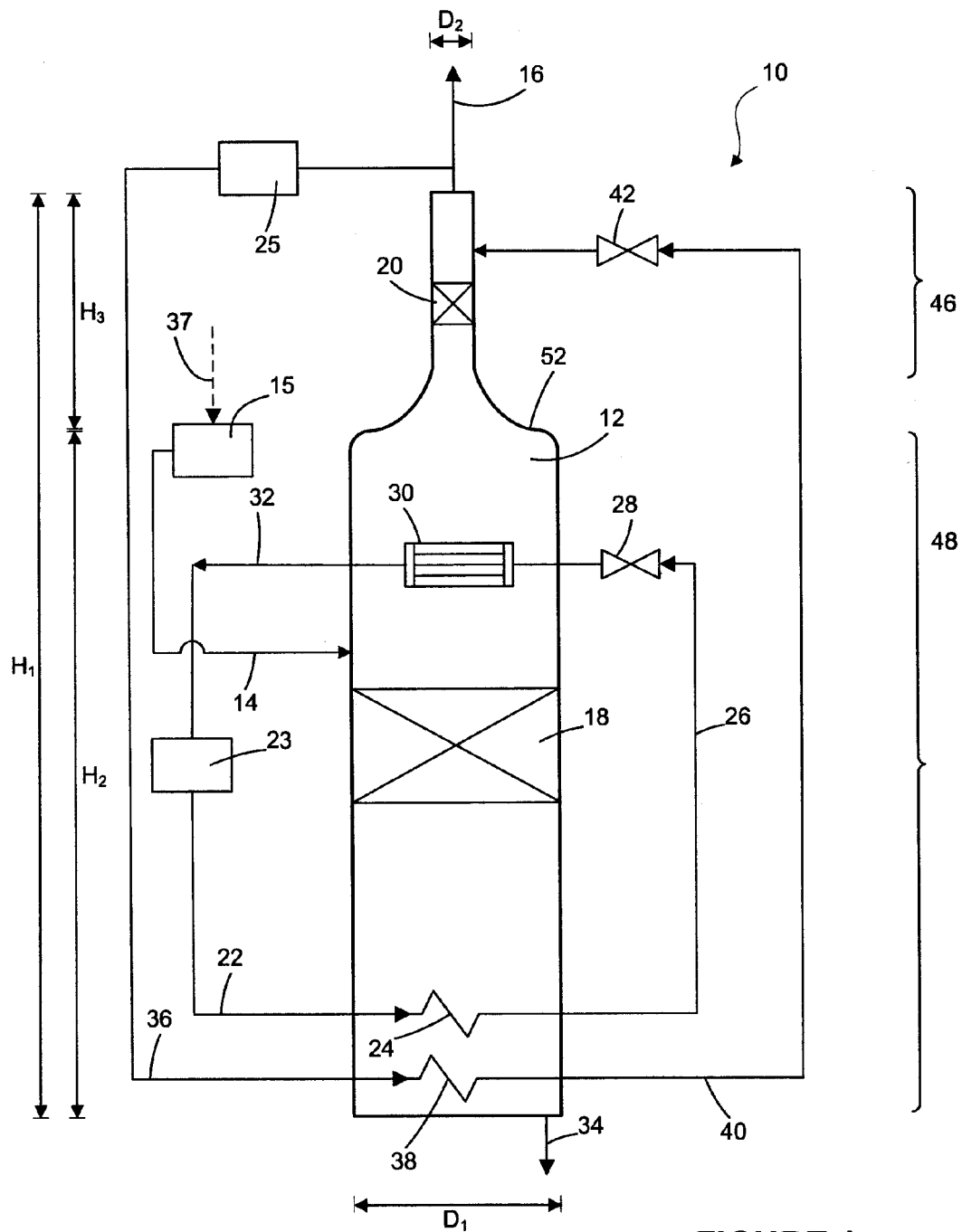
FIG. 1 is a flow diagram of an exemplary embodiment of the invention.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It should be understood that various changes may be made in the function and arrangement of elements without departing from the spirit and scope of the invention.

In order to aid in describing the invention, directional terms may be used in the specification and claims to describe portions of the present invention (e.g., upper, lower, left, right, etc.). These directional terms are merely intended to assist in describing and claiming the invention, and are not intended to limit the invention in any way. In addition, reference numerals that are introduced in the specification in association with a drawing figure may be repeated in one or more subsequent figures without additional description in the specification in order to provide context for other features.

In the claims, letters are used to identify claimed steps (e.g., (a), (b), and (c)). These letters are used to aid in referring to the method steps and are not intended to indicate the order in which claimed steps are performed, unless and only to the extent that such order is specifically recited in the claims.

Unless otherwise stated herein, any and all percentages identified in the specification, drawings and claims should be understood to be on a mole percentage basis.

Unless otherwise stated herein, any and all pressures identified in the specification, drawings and claims should be understood to mean absolute pressure.

As used herein, the terms "flow communication" and "fluid flow communication" are intended to mean that the elements described are connected (either directly or indirectly) in a manner that enables fluids to flow between the elements, including connections that may contain valves, gates, or other devices that may selectively restrict fluid flow.

As use herein, the term "conduit" is intended to mean any pipe, tube, passageway or the like, through which a fluid may be conveyed. An intermediate device, such as a pump, compressor or vessel may be present between a first device in fluid flow communication with a second device, unless explicitly stated otherwise.

As used herein, the terms "downstream" and "upstream" refer to the intended flow direction of the process fluid transferred. If the intended flow direction of the process fluid is from the first device to the second device, the second device is in downstream fluid flow communication of the first device.

As used herein, the term "cryogen" or "cryogenic fluid" is intended to mean a liquid, gas, or mixed-phase fluid having a temperature less than −70 degrees C. Examples of cryogens include liquid nitrogen (LIN), liquid oxygen (LOX), liquid argon (LAR), liquid helium, liquid carbon dioxide and pressurized, mixed phase cryogens (e.g., a mixture of LIN and gaseous nitrogen). As used herein, the term "cryogenic temperature" is intended to mean a temperature below −70 degrees C.

As used herein, the term "helium" refers to naturally occurring helium, which is a mixture of He-3 and He-4, with the content of He-3 typically in the range of 0.1-1.0 ppm by volume.

As used herein, the term "He-3 enriched helium" is intended to mean helium having a concentration of He-3 that is higher than the helium used as a feed stream for the process or apparatus in question. Conversely, "He-3 depleted helium" is intended to mean helium having a concentration of He-3 that is lower than the helium used as the feed stream for the process or apparatus in question.

The term "theoretical stage" is well-known in the art and, as used herein, is intended to have its ordinary meaning. The term "stage," as used herein, is intended to mean theoretical stage. For the purposes of the specification and claims of this application, theoretical stages should be understood to increase from top to bottom, with the uppermost stage being stage 1. In other words, for the purposes of this application, an element that is located at the $30^{th}$ theoretical stage of a column is below an element that is located at the $20^{th}$ theoretical stage.

Referring to FIG. 1, an exemplary distillation system 10 is shown. The system 10 comprises a distillation column 12 having packing 18, 20 positioned at several locations along the height H1 of the column.

Due to the inherently slow rate at which He-3 will be collected in the column 12, the column 12 is preferably relatively small. The construction of column 12 is preferably in accordance with conventional distillation columns used in cryogenic distillation processes. For example, the inner wall of the column 12 is preferably made of stainless steel or aluminum and is surrounded by a vacuum jacket. The column 12 has a generally cylindrical main section 48 and a top section 46, which is significantly smaller in diameter than the main section 48. The preferred overall height H1 of the column 12, as well as the individual heights H2 and H3 of the main section 48 and top section 46, respectively, will also depend upon the operational parameters of the system 10.

In order to enable separation of He-3 from helium, the column 12 is preferably operated in a temperature range of 2.3K-4.3K. The operating pressure of the column is preferably in the range of 5-15 psia (35-103 kPa) and, more preferably, in the range of 6-10 psia (41-60 kPa). The primary lower limitations on temperature and pressure are the avoidance of operating under conditions that would result in He-4 transitioning to a superfluid state, which occurs at 2.17K at 14.7 psia (101.4 kPa). The primary upper constraint on operating pressure is the critical pressure of He-3, which is 16.5 psia (113.8 kPa). With the parameters set forth in this paragraph, the preferred operating temperature and pressure for the column will vary, depending on the configuration and other operating conditions of the plant in which the system 10 is implemented.

A helium feed stream is introduced into the main section 48 of the column 12 via a feed conduit 14. The helium could be supplied from any suitable source. For example, the source could be storage vessel 15. In this exemplary embodiment, the feed stream is liquid helium (hereinafter "LHe"). In other embodiments, mixed phase vapor/liquid helium or helium vapor could be supplied to the feed stream. The preferred location of the feed conduit 14 will depend upon the operating conditions of the column 12. In a system for which the desired He-3 product purity is in the range of 99.0-99.9%, the feed stream would preferably be introduced via the feed conduit 14 at a location corresponding to a range of between the $20^{th}$ and $50^{th}$ theoretical stages and, more preferably, at a location corresponding to the $25^{th}$ theoretical stage.

This feed conduit 14 is connected to a suitable source of LHe and the LHe is supplied at a pressure that is higher than or equal to the operating pressure of the distillation column 12. Alternatively, the feed conduit 14 could be connected to a source of two-phase helium or helium vapor. The concentration of He-3 in the feed stream will depend upon the helium source, but will typically be in the range of 0.1-1.0 ppm by volume. A vaporous He-3-enriched (hereinafter "VHe-3") overhead stream exits the distillation column 12 at the top of the column via an overhead conduit 16 and is preferably compressed and then condensed. A portion of the condensed (liquid) He-3-enriched stream is recycled via conduit 36 (as described below), and the remaining portion is stored using any suitable means. For example, the condensed He-3-enriched stream could be pumped into a storage tank (not shown).

A bottom stream, comprising a He-3 liquid, exits the column 12 at the bottom via a bottom conduit 34 and is also collected and stored using any suitable means, such as a liquid storage tank (not shown). A pump (not shown) could optionally be used to increase the pressure of the He-3 depleted liquid that is fed to the storage tank.

In addition, it will be necessary to provide a source of make-up helium in order to balance the fluids being withdrawn via conduits 34 and 16. In FIG. 1, this source is shown supplying helium to the storage vessel 15 via conduit 37. Any suitable source of helium could be used and the make-up helium could be introduced at alternative locations.

In this exemplary embodiment, the heat for reboiling of helium in the column 12 (also referred to as a liquid stream) is provided by condensation of a vapor helium stream (hereinafter "VHe"), which is supplied to the upstream side of a heat exchanger 24 located at the bottom of the column 12 by a conduit 22. The VHe stream is supplied at a pressure that is higher than that of the column 12. A LHe stream exits the downstream side of the heat exchanger 24 via an intermediate conduit 26 and is then reduced in pressure through a valve or another flow restriction device 28, and vaporized in an intermediate condenser 30 to provide refrigeration for condensation of at least some of the fluid in the distillation column 12 that is in vapor phase at the location of the intermediate condenser 30 (referred to in the claims as a vapor stream). A VHe stream exits the downstream side of the intermediate condenser 30 via a conduit 32 at a relatively low pressure, where it is heated to close to ambient temperature, compressed to a higher pressure (using any suitable means, represented schematically as box 23), and recirculated through the heat exchanger 24 via conduit 22. Alternatively, the VHe stream could be cold compressed instead of being heated to ambient temperature prior to compression.

The intermediate condenser 30 is located in the main section 48 of the column 12 and above the location at which the feed conduit 14 feeds helium into the column 12. Preferably, the intermediate condenser 30 is positioned within the column 12 at or below a stage at which the concentration of He-3 is no more than 99.0% and, more preferably, no more than 1.0%.

The portion of the vaporous He-3-enriched overhead stream that is recycled is compressed and supplied to a heat exchanger 38 located near the bottom of the column 12 by the conduit 36, where it is condensed. The He-3-enriched stream may be heated to ambient temperature before compression and may also be cooled after compression to a cryogenic temperature by any suitable means prior to entering the heat exchanger 38. Box 25 schematically represents suitable means for heating, compressing, and cooling the He-3-enriched stream. The condensed VHe-3 stream is then fed by a conduit 40 as reflux into the column 12 in the top section 46, near the top of the column 12. A valve 42 is preferably located on the conduit 40, in order to reduce the pressure of the condensed VHe-3 stream before it is reintroduced into the column 12.

Providing the intermediate condenser 30 allows the volume of the top section 46 to be greatly reduced, thereby significantly reducing the amount of time required for a sufficiently high concentration of He-3 to be achieved. It also reduces the amount of liquid reflux at the top of the column 12 required to achieve acceptable separation performance, thereby reducing the energy consumption of the system 10. Reducing the reflux ratio—i.e., the ratio of the flow rate of liquid in the condensed VHe-3 stream flowing back to the column 12 through the conduit 40 to the flow rate of the vaporous He-3-enriched stream exiting the top of the column 12 via the overhead conduit 16 will increase the number of theoretical stages needed to accomplish the desired separation of He-3 from helium in the system 10. Applicants unexpectedly discovered that the required increase in the number of theoretical stages was relatively small in comparison to the resulting reduction in liquid and vapor traffic in the top section 46 of the column 12, thereby resulting in a significant reduction of the required volume of the column.

Applicants have discovered that providing a top section 46 having a diameter that is significantly smaller than that of the main section 48 and providing the intermediate condenser 30 at a location between zero and 30 stages above the LHe feed stream (conduit 14), at the conditions used for simulation, provides acceptable separation performance, while enabling the void volume and overall surface area of the column 12 to be significantly less than a system 10 in which these features are not provided. Due to the fact that the system 10 is operated at very low cryogenic temperatures, keeping the surface area of the column 12 to a minimum is a very important aspect of operational efficiency because surface area is proportional to heat loss. In addition, as noted above, keeping the overall volume of the column and the volume of the top section 46 small is even more important for this process due to the extremely small amount of He-3 in the feed stream.

In this exemplary embodiment, about 50 theoretical stages are required in order to enable recovery of 99% He-3 in the overhead stream via the overhead conduit 16. If higher He-3 purity is desired, more stages can be added to the top section 46 of the column 12 to achieve the desired purity. It is also expected that the best performance will be achieved with a configuration in which the diameter D1 of the main section 48 is preferably between 4 and 20 (more preferably about 10) times the diameter D2 of the top section 46. In the event that the diameter D1 of the main section 48 is ten times the diameter D2 of the top section 46, the flow area in the top section 46 is about 1% of that in the main section 48. Simulations run by the applicants on the system 10, show that providing a top section 46 having a diameter that is $\frac{1}{10}$ of the diameter D1 of the main section 48 in combination with the intermediate condenser 30 results in a drastic reduction in the liquid-vapor traffic in the top section 46 of the column 12, while unexpectedly requiring only a relatively small increase in the required number of theoretical stages, therefore resulting in a much smaller volume in the section where the concentration of He-3 is relatively high. This means that the time period required to establish a desired concentration profile of He-3 in the top section 46 can be greatly reduced from what would be required in the absence of the intermediate condenser 30.

Packing material 18, 20 is preferably located within both the top section 46 and the main section 48 of the column 12. In addition, any heat exchangers 24, 38 that perform a reboiling function are preferably located beneath all of the packing material 18, located in the column 12. Preferably, no packing material is positioned in the main section between the intermediate condenser 30 and the shoulder 52, which defines the transition between the main section 48 and the top section 46. The preferred arrangement of packing material described in this paragraph applies to all three systems 10, 110, 210 described herein. In addition, the column 12 may also include a distributor, liquid collectors and other components known in the art (not shown).

Figure 2:
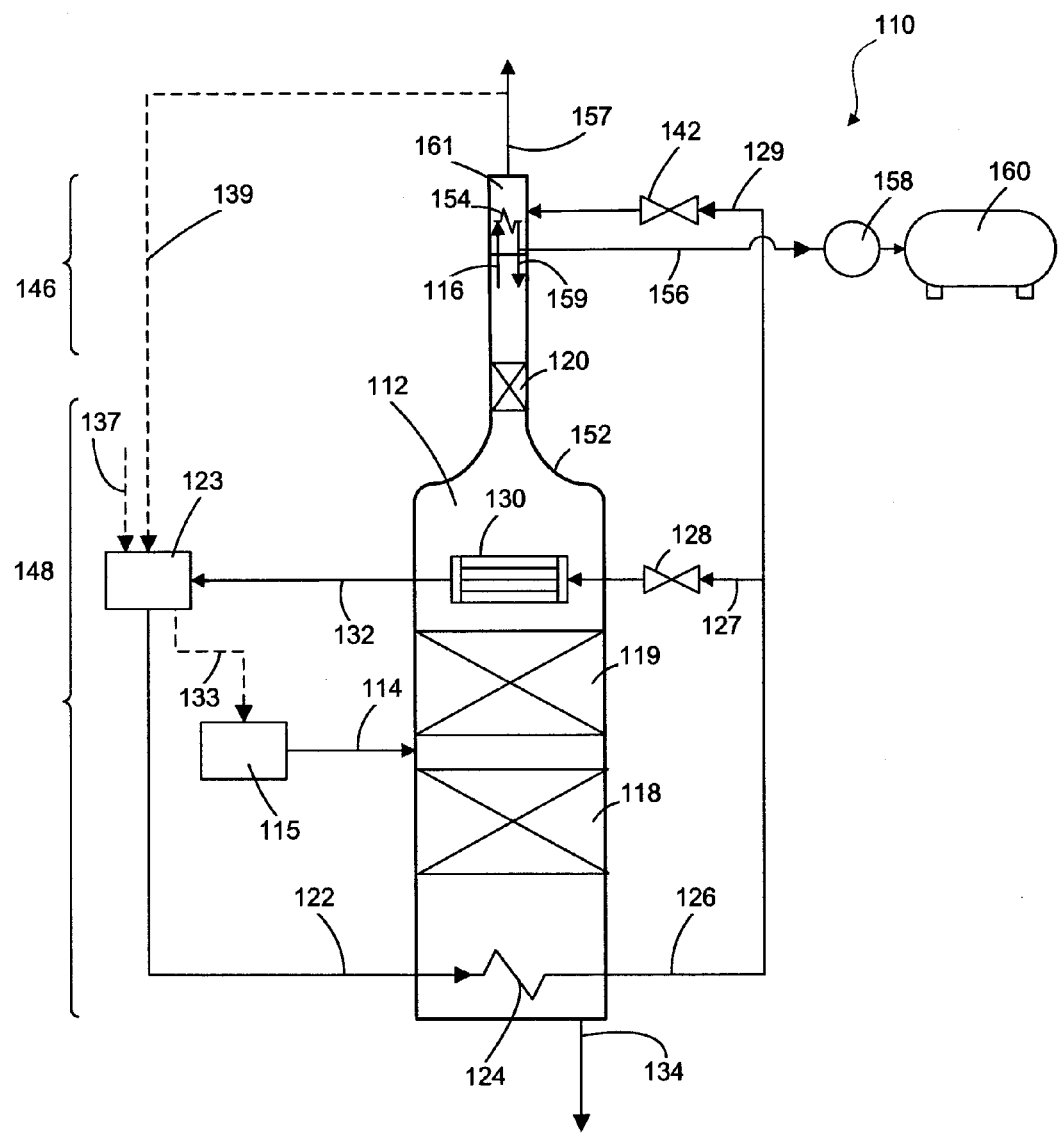
FIG. 2 is a flow diagram of a second exemplary embodiment of the invention.

Referring to FIG. 2, a second exemplary distillation system 110 is shown. In this system 110, elements shared with the system 10 shown in FIG. 1 are represented by reference numerals increased by a value of 100. For example, the feed conduit 114 shown in FIG. 2 corresponds to the feed conduit 14 shown in FIG. 1. In the interest of clarity, some features of this system 110 that are shared with the first system 10 are numbered in FIG. 2, but are not repeated in the specification.

In this exemplary system 110, after being passed through the heat exchanger 124, the condensed LHe stream in the intermediate conduit 126 is split into two streams, which flow through conduit 127 and a chamber conduit 129. The stream passing through conduit 127 is reduced in pressure and fed into the intermediate condenser 130, where the stream is vaporized. The stream flowing through the conduit 127 provides condensation duty for vapor rising in the column 112, thereby greatly reducing the amount of vapor that rises above the intermediate condenser 130. The other stream (referred to herein as the overhead vaporizing stream), which flows through the chamber conduit 129, is vaporized in a chamber 161 (often referred to in the art as a "can") located above the top of the column 112. A He-3-enriched vapor steam (also referred to herein as an overhead He-3-enriched stream) flows through the overhead conduit 116 into the upstream side of a condenser 154, where it is condensed through heat exchange with the helium that flows into the chamber 161 from the chamber conduit 129. This heat exchange results in vaporization of the helium, which is withdrawn from the top of the chamber 161 as an overhead vapor stream via a conduit 157. He-3 enriched liquid exits the downstream side of the condenser 154 and is separated into a reflux stream, which is returned to the top of the column 112 via conduit 159, and a product stream, which flows into conduit 156 and is pumped (using a pump 158) into a storage vessel 160.

The stream being fed to the intermediate condenser 130 via conduit 127 preferably represents a major fraction of the LHe stream from the intermediate conduit 126, and the stream being fed to the chamber 161 via the chamber conduit 129 preferably represents a minor fraction of the LHe stream from the intermediate conduit 126. This eliminates the need for a VHe-3 stream to be used for additional reboiling duty and reflux, as needed in the first exemplary system 10.

The helium vapor withdrawn from the chamber 161 in the overhead vapor stream via conduit 157 and helium vapor withdrawn from the downstream side of the intermediate condenser 130 via conduit 132 are preferably recycled via conduit 139 for use in reboiling (via heat exchanger 124) and/or as part of the feed stream. In either case, it is necessary to perform work on the helium vapor, for example by compressing, warming and/or cooling the vapor, by any suitable means (represented schematically by box 123) prior to being recycled. The portion of the helium vapor from conduits 139 and 132 that is used for reboiling is transported to the heat exchanger 124 via conduit 122. The portion of the helium vapor from conduits 139 and 132 that is used in the feed stream is transported via conduit 133 and is cooled and liquefied by any suitable means (represented schematically by box 115) prior to being reintroduced to the feed conduit 114. As noted above with respect to the first exemplary embodiment, the feed stream could alternatively be a two phase (vapor/liquid) stream or a vapor stream.

Make-up helium will need to be added to the system 110 in order to balance the fluids being withdrawn via conduits 134 and 156. Any suitable source of helium could be used and the make-up helium could be added at any suitable location. In FIG. 2, the make-up helium is shown as being added via conduit 137 at box 123, which schematically represents that apparatus in which work is performed on helium vapor from conduits 139 and 132. Alternatively, for example, make-up helium could be added at box 115, which schematically represents the apparatus used to liquefy helium prior to being introduced into the feed conduit 114.

In this exemplary system 110, packing material 119 is located between the feed conduit 114 and the intermediate condenser 130.

Figure 3:
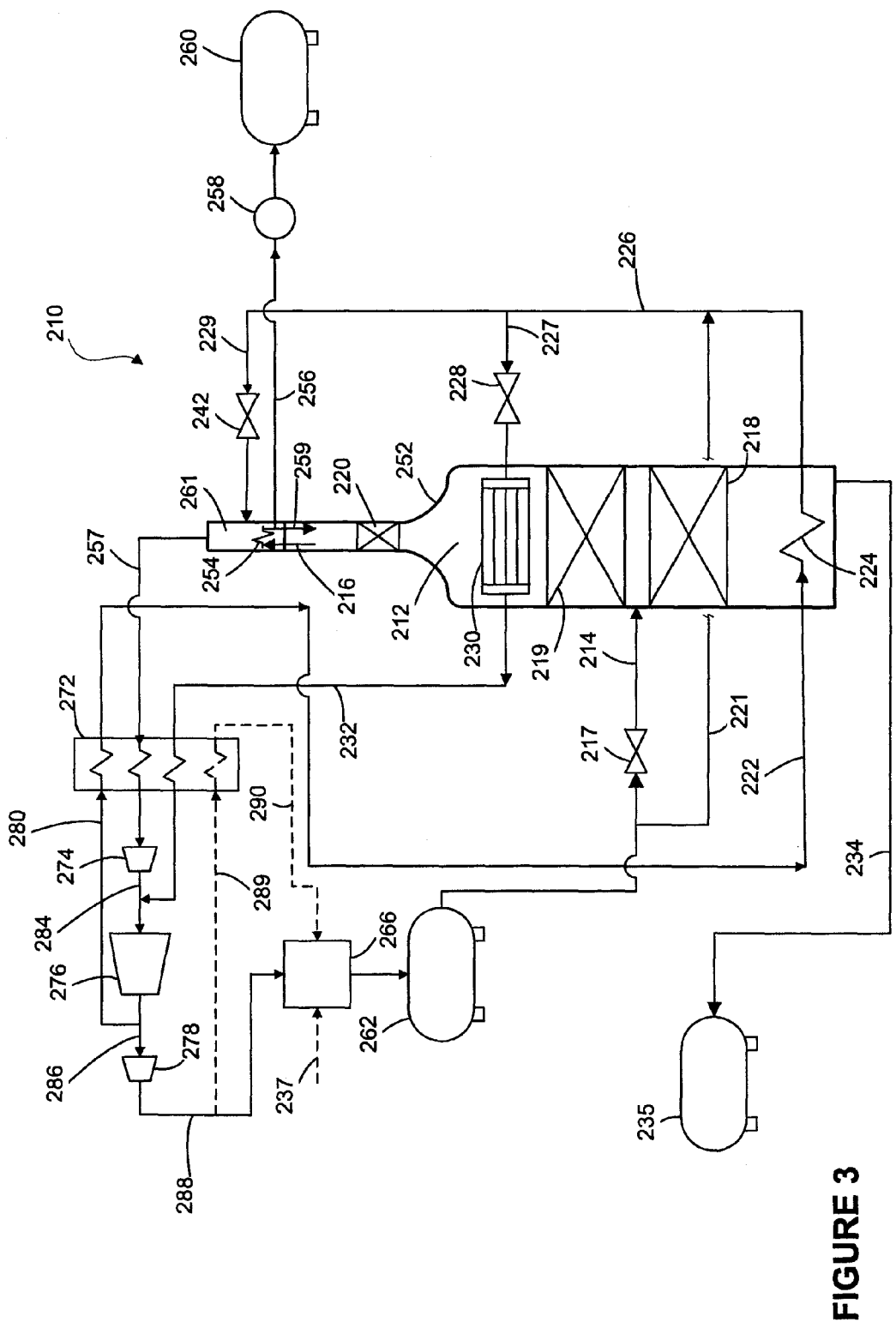
FIG. 3 is a flow diagram of a third exemplary embodiment of the invention, which shows the second exemplary embodiment incorporated into an exemplary liquefied helium plant.

Referring to FIG. 3, a third exemplary system 210 is shown. In this system 210, elements shared with the system 110 shown in FIG. 2 are represented by reference numerals increased by a value of 100. For example, the feed conduit 214 shown in FIG. 3 corresponds to the feed conduit 114 shown in FIG. 2. In the interest of clarity, some features of this system 210 that are shared with the system 110 are numbered in FIG. 3, but are not repeated in the specification.

The system 210 represents an example of the incorporation of the He-3 separation process into a helium liquefaction plant. In this system 210, LHe from a storage vessel 262 is fed into the column 212 via the feed conduit 214. A valve 217 is preferably provided on the feed conduit 214 in order to enable adjustment of flow rates and, if necessary, to reduce the pressure of the LHe feed stream before being introduced into the column 212.

An overhead vapor stream, which is produced from vaporization of the liquid He stream flowing through the chamber conduit 229 into the chamber 261, is withdrawn from the chamber 261 by conduit 257 and is heated to a temperature that is preferably close to ambient temperature by being passed through a heat exchanger 272, and then through three compression stages 274, 276, 278. Each of the stages 274, 276, 278 schematically shown in FIG. 3 could represent one or more physical stages. In addition, intercoolers (not shown) could optionally be provided between physical stages. A conduit 288 returns the helium to a liquefier 266, where it is liquefied, sent to the storage vessel 262, and then recycled through the feed conduit 214. A portion of the partially compressed helium is drawn from conduit 286 (extending between the second and third stages 276, 278) by conduit 280 and is cooled by the heat exchanger 272. The VHe stream exiting the heat exchanger 272 then flows into conduit 222, where it provides a reboiling function by being passed through a heat exchanger 224 located at or near the bottom of the column 212.

In this exemplary system 210, a portion of the LHe feed stream is diverted from the feed conduit 214 via conduit 221, which is then combined with the condensed LHe stream in the intermediate conduit 226. As in system 110, the helium stream in intermediate conduit 226 is then split into two streams. One of the streams is fed to, and vaporized in, the intermediate condenser 230 via conduit 227 and the other stream is fed to, and vaporized in, the chamber 261 via the chamber conduit 229. The stream being fed to the intermediate condenser 230 by conduit 227 preferably represents a major fraction of the LHe stream from intermediate conduit 226, and the stream being fed to the chamber 261 by the chamber conduit 229 preferably represents a minor fraction of the LHe stream flowing through intermediate conduit 226.

The vaporized He stream exiting the downstream side of the intermediate condenser 230 via conduit 232 passes through the heat exchanger 272. Optionally, at least a portion of the helium stream exiting the last compression stage 278 may be diverted via conduit 289 to be cooled via the heat exchanger 272, before being delivered to the liquefier 266 via a conduit 290. Accordingly, the overall effect of the heat exchanger 272 is to cool the portion of the recycled VHe stream which is drawn off between the second and third stages 276 via conduit 280 and the portion of the VHe stream flowing through conduit 289, to heat the overhead vapor stream in conduit 257 to a temperature close to ambient temperature prior to the first compression stage 274, and to heat the VHe stream in conduit 232 to a temperature close to ambient temperature prior to being combined with the VHe stream in conduit 284 at a location in the compression process where the pressures in the conduit 284 and conduit 232 are roughly equal. In this exemplary embodiment, this occurs between the first and second compression stages 274, 276.

The LHe-4 stream exiting the bottom of the column 212 via the bottom conduit 234 is preferably stored in a storage vessel 235 that is separate from the storage vessel 262 that is used as the source of LHe for the feed conduit 214 because the LHe-4 stream is depleted of He-3. A pump (not shown) could optionally be used to boost the pressure of the LHe-4 stream before it is fed into the storage vessel 235.

Due to expected heat leaks that will be experienced when operating this system 210, additional refrigeration will be necessary in order to maintain the desired operating temperature. This can be accomplished by introducing one or, more preferably, several turbo expanders or using other forms of cryogenic coolers/refrigerators known in the art. In addition, additional make-up helium will need to be added via conduit 237 to the system 210 in order to balance the fluids being withdrawn via conduits 234 and 256. Any suitable source of helium could be used.

Example 1

This example is based on the exemplary system 10 shown in FIG. 1 and described above. The total number of theoretical stages is 50. The intermediate condenser 30 is located above stage 25.

The LHe feed stream is fed into the column 12 via conduit 14 from a source of LHe having about 0.1 ppm He-3 at a flow rate of 1 kmol/s, at a pressure that is roughly equal to pressure in the column 12, and at a temperature below the dew point of the fluid in the LHe feed stream. A LHe-4 stream is withdrawn from the bottom of the column 12 via the bottom conduit 34 at a temperature of about 3.26K. A VHe stream is fed into the heat exchanger 24 via conduit 22 at a flow rate of approximately 1 kmol/s, a pressure that allows it to condense at a temperature somewhat higher than 3.26 K (e.g., 0.1 K higher), and a temperature of close to its dew point.

A stream of VHe-3 at a purity of 99.3% is withdrawn at the top of the column 12 via overhead conduit 16 at a flow rate of at least $9.93 \times 10^{-8}$ kmol/s, at a pressure of 5 psia (34 kPa) and temperature of 2.33K. The portion of the VHe-3 stream that is diverted via conduit 36 for reboiling has a flow rate of 0.01 kmol/s.

Example 2

This example is based on the exemplary system 110 shown in FIG. 2 and described above. The total number of theoretical stages is 55. The intermediate condenser 130 is located at the 20th stage.

The LHe feed stream is fed into the column 112 via the feed conduit 114 from a source of LHe having about 0.2 ppm He-3 at a flow rate of 1 kmol/s, a pressure that is above the pressure in the column 112 and a temperature close to its dew point. The LHe-4 stream is withdrawn from the bottom of the column 12 via conduit 134 at a temperature of 3.26K. The VHe stream is fed into the heat exchanger 124 via conduit 122 at a flow rate of 1 kmol/s, a pressure of 6 psia (41 kPa), and at a temperature near its dew point.

The LHe stream is fed into the intermediate condenser 130 via conduit 127 at a pressure of 4 pisa (28 kPA). The LHe stream is fed into the chamber 161 by a chamber conduit 129 as reflux at a flow rate of 0.0059 kmol/s and a pressure of 0.85 psia (586 Pa).

A stream of LHe-3 at a purity of 99.3% is withdrawn from the condenser 154 via conduit 156 at a flow rate of 0.0000002 kmol/s, a pressure of 5 psia, and temperature of 2.33K. A stream of VHe is withdrawn from the top of the chamber 161 via conduit 157 at a flow rate of 0.0059 kmol/s, a pressure of 0.85 psia (586 Pa), and a temperature of 2.23K.

The duty of the intermediate condenser 130 is −90.000 kW/h. The duty of the heat exchanger 124 used for reboiling is 88.621 kW/h. The duty of the condenser 154 is −0.452 kW/h.

Example 3

This example is also based on the exemplary system 110 shown in FIG. 2 and described above. The total number of theoretical stages is 75. The intermediate condenser 130 is located at the 20th stage.

The LHe feed stream is fed into the column 112 via the feed conduit 114 from a source of LHe having about 0.1 ppm He-3 at a flow rate of 1 kmol/s, a pressure that is above the pressure in the column 112 and a temperature close to its dew point. The LHe-4 stream is withdrawn from the bottom of the column 12 via conduit 134 at a temperature of 3.53K. The VHe stream is fed into the heat exchanger 124 via conduit 122 at a flow rate of 1 kmol/s, a pressure of 14.7 psia (101 kPa), and at a temperature near its dew point.

The LHe stream is fed into the intermediate condenser 130 via conduit 127 at a pressure of 4 psia (28 kPa). The LHe stream is fed into the chamber 161 via the chamber conduit 129 as reflux at a flow rate of 0.02 kmol/s and a pressure of 1.22 psia (8.41 kPa).

A stream of LHe-3 at a purity of 99.9% is withdrawn from the condenser 154 via conduit 156 at a flow rate of 0.0000001 kmol/s, a pressure of 7 psia (48 kPa), and a temperature of 2.57K. A stream of VHe is withdrawn from the top of the chamber 161 via conduit 157 at a flow rate of 0.02 kmol/s, a pressure of 1.22 psia (8.41 kPa), and a temperature of 2.40K.

The duty of the intermediate condenser 130 is −120.000 kW/h. The duty of the heat exchanger 124 used for reboiling is 122.519 kW/h. The duty of the condenser 154 is −0.851 kW/h.

As such, an invention has been disclosed in terms of preferred embodiments and alternate embodiments thereof. Of course, various changes, modifications, and alterations from the teachings of the present invention may be contemplated by those skilled in the art without departing from the intended spirit and scope thereof. It is intended that the present invention only be limited by the terms of the appended claims.

The invention claimed is:

1. A method for recovering He-3 from helium, the method comprising:
   (a) introducing a feed stream comprising helium into a main section of a distillation column at a first location;
   (b) withdrawing an overhead stream comprising He-3-enriched helium from a top section of the distillation column, the main section of the distillation column being located below the top section, the main section having a first diameter that is greater than a second diameter of the top section;
   (c) withdrawing a bottom stream comprising He-3 depleted helium from a bottom portion of the main section of the column; and
   (d) condensing at least a first portion of a vapor stream in the distillation column by heat exchange with a first stream as the first stream passes through an intermediate condenser located at a third location within the main section of the distillation column, wherein the third location is above the first location.

2. The method of claim 1, wherein step (b) comprises withdrawing and recovering an overhead stream comprising He-3-enriched helium from the top section, wherein the first diameter is at least four times larger than the second diameter.

3. The method of claim 1, wherein step (d) comprises condensing at least a first portion of a vapor stream in the distillation column by heat exchange with a first stream comprising helium or He-3 depleted helium as the first stream passes through an intermediate condenser located at a third location within the main section of the distillation column at which a concentration of He-3 within the distillation column is no more than 99.0%.

4. The method of claim 1, further comprising the step of:
   (e) maintaining an interior of the distillation column within a pressure range of 5-15 psia (35-103 kPa) while performing steps (a) through (d).

5. The method of claim 1, further comprising the step of:
   maintaining an interior of the distillation column within a temperature range of 2.3 K to 4.3 K while performing steps (a) through (d).

6. The method of claim 1, further comprising the steps of:
   (g) dividing the overhead stream into a first portion of the overhead stream and a second portion of the overhead stream; and
   (h) reintroducing the first portion of the overhead stream into the top section of the distillation column as reflux.

7. The method of claim 1, further comprising the step of:
(i) reboiling a portion of a liquid stream in the distillation column by heat exchange with a second helium stream.

8. The method of claim 1, further comprising the steps of:
(j) condensing the overhead stream by heat exchange with an overhead vaporizing stream, wherein at least a portion of the overhead vaporizing stream is vaporized, forming an overhead vapor stream;
(k) returning a first portion of the overhead stream condensed in step (j) to the top section of the distillation column as reflux; and
(l) storing a second portion of the overhead stream condensed in step (j) in a product storage vessel.

9. The method of claim 8, further comprising the steps of:
(m) combining the overhead vapor stream with a third helium stream withdrawn from a downstream side of the intermediate condenser to form a first combined stream; and
(n) reboiling a liquid stream in the distillation column by heat exchange with at least a first portion of the first combined stream.

10. The method of claim 9, further comprising the step of:
(o) prior to performing step (m), increasing a pressure of the overhead vapor stream; and
(p) increasing a second pressure of the first combined stream before performing step (n).

11. The method of claim 9, further comprising the step of:
(q) after performing step (n) on the at least a first portion of the combined stream, dividing the at least a first portion of the combined stream into the first stream and the overhead vaporizing stream, wherein the first stream comprises a major fraction of the first portion of the combined stream and the overhead vaporizing stream comprises a minor fraction of the first portion of the combined stream.

12. The method of claim 11, further comprising the steps of:
(r) diverting a bypass stream from the feed stream; and
(s) combining the bypass stream with the at least a first portion of the combined stream before performing step (q).

13. The method of claim 9, further comprising the step of:
(t) liquefying the second portion of the combined stream and introducing the liquefied second portion of the combined stream to a supply vessel that is in fluid flow communication with the feed stream.

14. The method of claim 9, further comprising the step of:
(u) cooling the first portion of the combined stream by heat exchange with the overhead vapor stream and the third helium stream.

15. A method for recovering He-3 from helium, the method comprising:
(a) introducing a feed stream comprising helium into a main section of a distillation column at a first location;
(b) withdrawing an overhead stream comprising He-3-enriched helium from a top section of the distillation column, the main section of the distillation column being located below the top section, the main section having a first diameter that is greater than a second diameter of the top section;
(c) dividing the overhead stream into a first portion of the overhead stream and a second portion of the overhead stream;
(d) reintroducing the first portion of the overhead stream into the top section of the distillation column as reflux and recovering the second portion of the overhead stream in a vessel;
(e) withdrawing a bottom stream comprising He-3 depleted helium from a bottom portion of the main section of the column;
(f) reboiling a liquid stream in the distillation column by heat exchange with a first helium stream;
(g) after performing step (f) on the first helium stream, condensing at least a first portion of a vapor stream in the distillation column by heat exchange with the first helium stream as the first helium stream passes through an intermediate condenser located at a third location that is above the first location and is within the main section of the distillation column; and
(h) maintaining an interior of the distillation column within a pressure range of 5-15 psia (35-103 kPa) and within a temperature range of 2.3 K to 4.3 K while performing steps (a) through (g).

16. An apparatus for recovering He-3 from helium, the apparatus comprising:
a distillation column having a main section and a top section, the main section being located below the top section and the main section having a first diameter that is greater than a second diameter of the top section;
a feed conduit for introducing a feed stream comprising helium into the distillation column at a first location, the feed conduit being in fluid flow communication with a supply of helium;
an overhead conduit for withdrawing a overhead stream comprising He-3-enriched helium from the top section of the distillation column;
a bottom conduit for withdrawing a bottom stream comprising He-3-depleted helium from a bottom of the main section of the distillation column; and
an intermediate condenser located in the main section at a third location that is located above the first location and having an upstream side that is in fluid flow communication with an intermediate conduit that supplies a first stream to the upstream side of the intermediate condenser.

17. The apparatus of claim 16, wherein the first diameter is at least four times larger than the second diameter.

18. The apparatus of claim 16, further comprising a first heat exchanger located in a bottom portion of the main section, wherein the intermediate conduit is in flow communication with a downstream side of the first heat exchanger.

19. The apparatus of claim 18, further comprising a chamber conduit and a top condenser, the chamber conduit being in flow communication with the intermediate conduit and with a chamber located above the top section of the distillation column, the top condenser being located with the chamber, the overhead conduit being in fluid flow communication with an upstream side of the top condenser.

20. The apparatus of claim 19, wherein the intermediate conduit is in fluid flow communication with the chamber and supplies a second stream to the chamber.

* * * * *